Patented June 21, 1927.

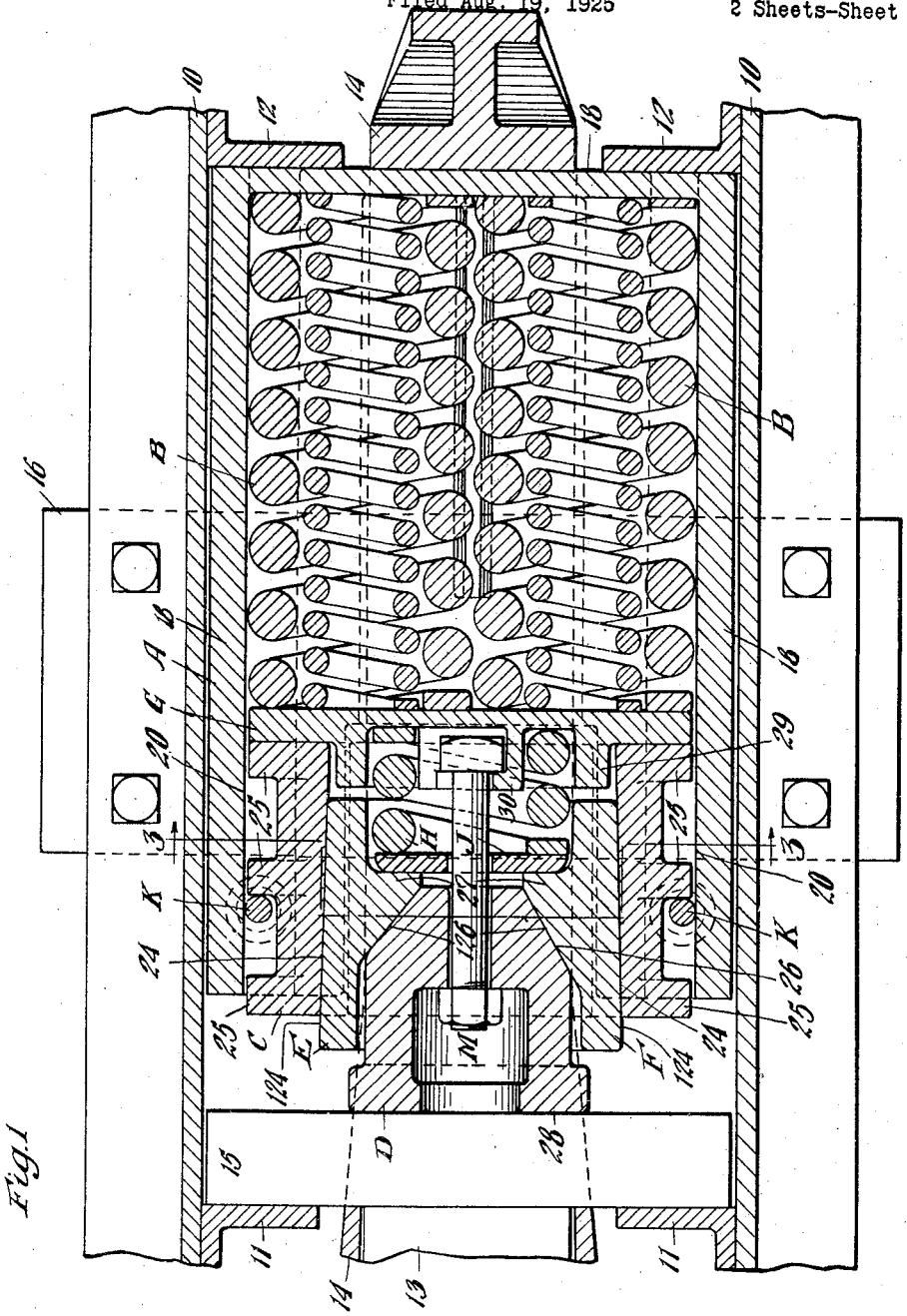

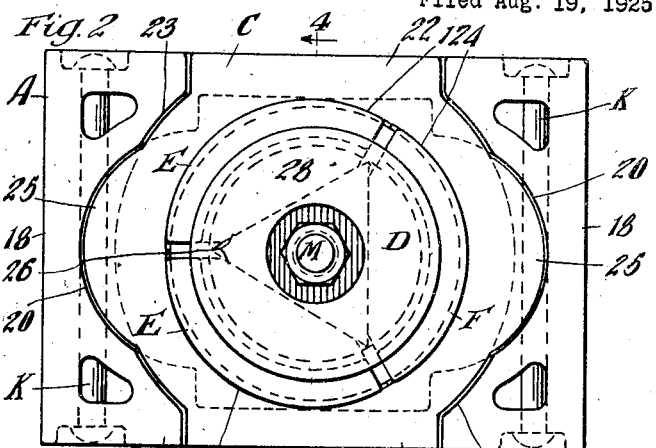
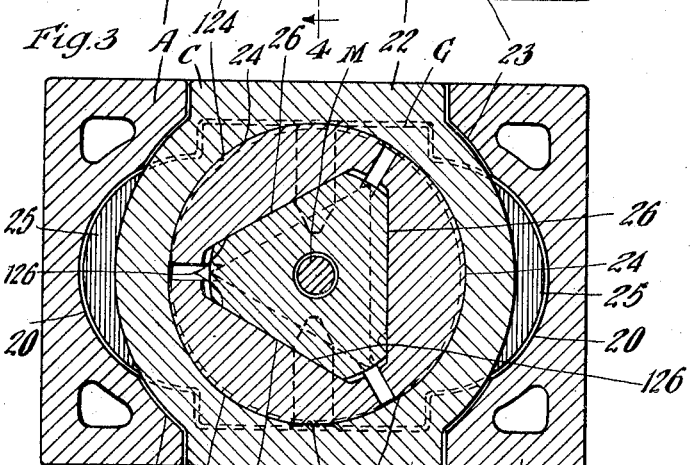
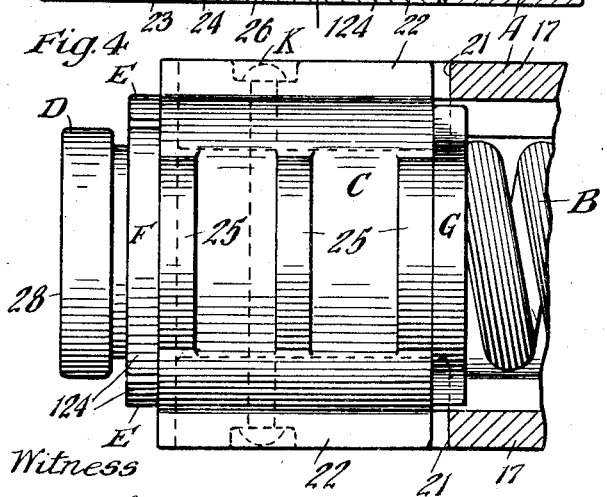

1,632,917

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 19, 1925. Serial No. 51,106.

This invention relates to improvements in friction shock absorbing mechanisms.

One object of the invention is to provide a friction shock absorbing mechanism especially adapted for railway draft riggings, including a spring cage and a friction shell having limited relative movement to provide for preliminary light action, the movement of the shell and friction elements being resisted by relatively heavy twin arranged main springs, wherein the spring cage is open at one end only to permit assembling the parts of the mechanism by insertion through the open end of the same, thereby permitting all the walls of the shell to be made solid to provide a column load extension element of exceptionally great strength.

Other objects and advantages of the invention will more fully and clearly appear from the description and claims hereinafter following.

In the drawings forming a part of this specification, Figure 1 is a longitudinal, sectional view of a portion of a railway draft rigging, showing my improvements in connection therewith. The section through the friction elements and shell corresponding to two intersecting planes at an angle of 120 degrees to each other. Figure 2 is a front end elevational view of the shock absorbing mechanism proper. Figure 3 is a transverse, vertical, sectional view corresponding substantially to the line 3—3 of Figure 1. And Figure 4 is a longitudinal, vertical, sectional view of the front end of the mechanism, corresponding substantially to the line 4—4 of Figure 2, the friction shell and the parts associated therewith being shown in side elevation.

In said drawings, 10—10 indicate channel-shaped center or draft sills of a railway car underframe, to the inner faces of which are secured front stop lugs 11—11 and rear stop lugs 12—12. The inner end portion of the drawbar is indicated by 13, to which is operatively connected a hooded yoke 14 of well known form. The shock absorbing mechanism proper, as well as a front main follower 15, are disposed within the yoke. The yoke and the parts contained therein are supported in operative position by a detachable saddle plate 16.

The improved shock absorbing mechanism proper, as shown, comprises broadly a casing A; twin arranged main springs B—B; a friction shell C; a wedge block D; three friction shoes E, E and F; a main spring follower G; an auxiliary spring resistance H; an auxiliary spring follower J; a pair of retaining pins K—K; and a retainer bolt M.

The casing A is of generally rectangular box-like form having horizontally disposed top and bottom walls 17—17, vertically disposed spaced side walls 18—18, and a transverse rear end wall 19. The end wall 19 co-operates with the rear stop lugs 12 in the manner of the usual rear follower. The side walls of the casing A are relatively heavy and are cut away on the interior sides thereof, longitudinally, as indicated at 20—20. The cut away portions 20 conform substantially to the exterior contour of the twin arranged springs B and these cut away portions extend from end to end of the casing as most clearly shown in Figures 1, 2 and 3. At the forward end, the top and bottom walls 17 of the casing are cut away as shown, thereby providing abutment shoulders 21—21 at the top and bottom of the casing, spaced inwardly from the front end thereof.

The friction shell C is of substantially cylindrical form and has top and bottom projections 22—22 adapted to work in the cut away portions of the top and bottom walls 17 of the casing. Adjacent the openings in the top and bottom walls 17, the side walls are interiorly cut away as indicated at 23 to accommodate the main body portion of the friction shell. The friction shell is provided with three interior, true cylindrical friction surfaces 24—24 converging inwardly of the mechanism. The surfaces 24 are so disposed that the inner ends form a complete true circle. At each side the friction shell is provided with three spaced, exterior ribs 25—25, corresponding in outline to the cutaway portions of the side walls of the casing. One of the ribs of each set is disposed midway between the front and rear ends of the shell while the remaining ribs are disposed immediately adjacent the ends thereof, as most clearly shown in Figures 1 and 4.

The friction shoes E, E and F are of similar construction, except as hereinafter pointed out. Each shoe is formed with an outer true cylindrical friction surface 124 adapted to co-operate with one of the friction surfaces 24 of the shell. Each shoe is also provided with an inner wedge face 26 formed on a lateral enlargement 27 on the shoe. The faces 26 of the two shoes E extend at a relatively blunt angle with respect to the longitudinal axis of the mechanism and the face 26 of the shoe F extends at a relatively keen angle to the axis. The rear faces of the enlargements 27 bear on the auxiliary spring follower J which is in the form of a relatively heavy disk. The auxiliary spring follower J in turn bears on the forward end of the auxiliary spring resistance H.

The wedge D is in the form of a cast block, suitably cored and having a flat front face 28 adapted to bear on the inner side of the front follower 15. At the inner end, the block D is provided with three inwardly converging wedge faces 126—126, arranged around the axis of the mechanism. Two of the faces 126 co-act with the faces 26 of the two blunt angled shoes E and are correspondingly inclined thereto, whereas the remaining wedge face 126 of the block is inclined to correspond with the wedge face of the shoe F and is adapted to co-operate therewith.

The main spring follower G is in the form of a relatively heavy plate, having lateral side extensions between the top and bottom edges thereof, corresponding in external contour to the cut away portions 20 of the side walls of the spring cage. At the forward side, the spring follower plate G is provided with an annular flange 29 adapted to co-operate with the inner ends of the friction shoes to limit relative movement of the latter and the spring follower. The outer side of the spring follower abuts the inner end of the auxiliary spring resistance H which is seated within the annular flange 29. At the forward side, the spring follower G is also provided with a central boss 30 recessed as indicated to receive the head of the retainer bolt M and is slotted as shown to accommodate the shank of the bolt. As clearly shown in Figure 1, the recess in the boss 30 is open at one side to permit lateral insertion of the bolt M. The outer end of the bolt M is anchored to the wedge block D, the nut of the bolt being accommodated within the recess thereof. The retainer bolt M is adapted to maintain the parts of uniform overall length and hold the spring H under initial compression.

The twin arranged main spring resistance elements B—B comprise two units, each unit including a light inner coil and a relatively heavy outer coil. The springs B are interposed between the spring follower G and the transverse end wall 19 of the casing A. In the normal full release position of the parts, the spring follower G abuts the inner end of the friction shell C, and limits the expansion of the spring B, the latter being preferably placed under initial compression. In this position of the parts, the annular flange 29 of the spring follower is spaced inwardly slightly with reference to the inner ends of the friction shoes E, E and F.

The pins K which are two in number, are disposed at opposite sides of the mechanism, at the forward end of the casing, and co-operate with the central ribs 25 of the friction shell to limit outward movement of the latter. Each of the side walls is provided with a vertically disposed opening to receive the corresponding pin K and the casing is counter-sunk at the top and bottom as shown in Figure 2 to accommodate the heads of the pins. When the shell is in its outermost position as shown in Figures 1 and 4, the inner end thereof is spaced from the abutment shoulders 21 to permit a limited amount of movement between the shell and casing to provide for preliminary spring action of the mechanism.

The mechanism is assembled as follows: The main springs B and the spring follower G are first placed within the casing by inserting the same through the open end thereof. The friction shell C is next placed in position, forced inward, compressing the springs B and the pins K inserted to retain the shell in assembled relation with the cage and limit the outward movement thereof. The friction shoes, main wedge, auxiliary spring and auxiliary spring follower are then assembled within the friction shell and secured in position by the retainer bolt M.

The operation of my improved shock absorbing mechanism upon a compression stroke, is as follows: The front follower 15 and the casing A will be moved relatively toward each other, forcing the wedge block D inwardly of the mechanism, spreading the friction shoes E, E and F and carrying the same inwardly also. During the initial action of the mechanism, the auxiliary spring H will be compressed and the friction shell will be carried inwardly with the wedge and friction shoes due to the friction existing between the latter and the shell, compressing the main spring resistance elements B. This action will continue until the inner end of the friction shell comes into abutment with the shoulders 21 of the casing A, whereupon further inward movement of the shell with reference to the casing will be positively limited and the shoes will be forced to slip inwardly on the friction surfaces of the shell. During the initial action, the spring H will be compressed to such an extent that the friction shoes will engage the annular flange 29 of the main spring follower G. Upon movement of the friction shell being limited, the main spring follower G will be forced inwardly, together with the friction shoes against the resistance of the springs B. This action will continue either until the actuating force is reduced or the main follower 15 comes into abutment with the front end of the casing A, whereupon the force will be transmitted directly through the main follower 15 and casing A to the corresponding stop lugs. When the actuating force is reduced, the springs B and H will return the parts to normal position, outward movement of the spring follower being limited by engagement with the inner end of the friction shell and the shell in turn being limited by engagement with the pins K. Outward movement of the main wedge D will be limited by the retainer bolt M which is anchored to the spring follower G. The wedge will in turn limit the outward movement of the friction shoes E, E and F.

It will be evident that there will be substantially no wedging action between the blunt faces of the wedge and the shoes, while a true wedging action will be effected between the co-acting keen faces of the wedge and the shoe F. Due to the wedging action, there will be a slight expansion of the friction shell during compression of the mechanism, thereby storing up energy therein, whereby the shell will forcibly contract when the actuating pressure is reduced, creating lateral inward pressure on the blunt faced shoes E and facilitating release of the main wedge, due to the releasing angle of the co-operating faces of the main wedge and the shoes E. By the employment of the blunt and keen sets of wedge faces, I am enabled to obtain a very high wedging action during the compression stroke, since the keen wedge faces may be made relatively acute without danger of the parts sticking, the blunt wedge faces acting more or less as "safety valves." In this connection, it will be understood by those skilled in the art that my improvements are capable of use in a mechanism either employing a blunt and keen angle system of wedge faces or wedge faces which are all of the same angle with respect to the axis of the mechanism. Compensation for wear of the various friction and wedge faces is obtained by the auxiliary spring resistance H, which is under initial compression, as hereinbefore pointed out, and is adapted to force the friction shoes E, E and F outwardly with reference to the main wedge and friction shell as wear occurs.

From the preceding description, taken in connection with the drawings, it will be evident that I have provided a mechanism of exceedingly simple construction, which may be easily assembled, and in which the casing forming the spring cage has unusually great column strength.

While I have herein shown and described what I now consider the preferred manner of carrying out my invention, the same is merely illustrative and I contemplate all changes and modifications that come within the scope of the claims appended thereto.

I claim:

1. In a friction shock absorbing mechanism, the combination with a spring cage open at one end; of a friction shell having interior friction surfaces, said shell and cage having limited relative movement; means restricting the opening of said cage and engaging the shell for detachably connecting the shell to the cage; a friction wedge system co-operating with the friction shell; twin arranged springs within the cage; and a spring follower co-operating with the friction system, said means for detachably connecting the shell to the cage being removable to permit free insertion of the spring and spring follower through the open end of the cage.

2. In a friction shock absorbing mechanism, the combination with a friction shell; of a casing open at one end, said casing and shell having limited relative movement; retaining means on said casing restricting the opening thereof and engaging the shell to prevent removal of the shell from the casing, said casing rearwardly of the shell forming a spring cage; twin arranged springs within the casing adapted to be inserted through the open end thereof, the retaining means being removable from the casing to permit free insertion of said springs; a spring follower within the casing co-operating with the friction shell; and a friction wedge system co-operating with the friction shell and spring follower.

3. In a friction shock absorbing mechanism, the combination with a spring cage open at one end; of a spring resistance within said cage; a detachable friction shell, said shell and cage having limited relative movement; pins extending into the cage and restricting the opening thereof and engaging the shell for maintaining said shell and cage assembled, said pins being removable from the cage to provide clearance for insertion of the spring resistance through the open end of the cage; and wedge-friction-shoes co-operating with the shell.

4. In a friction shock absorbing mechanism, the combination with a spring cage open at one end; of a spring resistance within said cage; a friction shell, said shell and cage having co-operating means thereon for limiting relative movement thereof toward each other; means restricting the opening of the cage and co-operating with the shell for limiting the relative separation of said cage and shell longitudinally, said means being removable to provide clearance for insertion of the spring resistance through the open end of the cage; wedge-friction-shoes co-operating with the shell; and a spring follower within the cage co-operating with the friction shell and shoes.

5. In a friction shock absorbing mechanism, the combination with a substantially rectangular spring cage, said cage being open at one end only and having abutment walls at said open end; of twin arranged main springs and a spring follower within the cage; a friction shell co-operating with the spring follower, said shell and cage having limited relative movement, movement of the shell inwardly of the cage being limited by said abutment walls; retaining means restricting the opening of said cage, said retaining means being mounted on the cage to engage and limit outward movement of the friction shell, said retaining means being detachable from the cage to permit free entrance of the spring follower and spring through the open end of the cage; and a friction wedge system co-operating with the shell.

6. In a friction shock absorbing mechanism, the combination with a spring cage open at one end only; of twin arranged coil spring units within the spring cage, said units being disposed in transverse alinement, the combined exterior diameters of said units approximating the width of the cage; a spring follower within the cage co-operating with said spring units, said twin spring units and follower being freely insertible through the open end of the cage; a friction shell having interior cylindrical friction surfaces; means on said cage for limiting movement of the shell inwardly thereof; pins secured to the casing for limiting outward movement of the shell; friction shoes co-operating with the shell and said spring follower; and a wedge pressure transmitting element co-operating with the shoes.

7. In a friction shock absorbing mechanism, the combination with a rectangular casing open at one end; of a friction shell having interior cylindrical friction surfaces, said shell and casing having limited relative movement; means on the casing restricting the opening thereof and co-operating with the shell for holding the shell assembled therewith, said means being removable; twin arranged main co-operating springs and a spring follower within the casing, the side walls of the casing being cut away interiorly to permit of insertion of said spring follower and springs through the front end of the casing, when said retaining means is removed therefrom; friction shoes within the shell; a wedge co-operating with the shoes; and an auxiliary spring resistance interposed between the friction shoes and spring follower.

In witness that I claim the foregoing I have hereunto subscribed my name this 15th day of August, 1925.

JOHN F. O'CONNOR.